United States Patent [19]
Rupert et al.

[11] Patent Number: 5,614,716
[45] Date of Patent: Mar. 25, 1997

[54] ALTERNATING CURRENT METHOD AND APPARATUS FOR AMBIENT TEMPERATURE COMPENSATION FOR MODULATED ENERGY SENSORS

[75] Inventors: Robert E. Rupert, South Dennis; Norman C. Anderson, Chatham, both of Mass.

[73] Assignee: Infratemp, Inc., South Dennis, Mass.

[21] Appl. No.: 639,913

[22] Filed: Apr. 26, 1996

[51] Int. Cl.$^6$ ............... G01J 5/16; H05B 11/00
[52] U.S. Cl. ............. 250/338.1; 250/340; 250/372; 250/252.1; 219/494; 219/497; 374/133
[58] Field of Search ............ 250/338.1, 340, 250/372, 252.1 A; 219/494, 497; 374/133

[56] References Cited

U.S. PATENT DOCUMENTS

| 3,610,931 | 10/1971 | Woolfson | 250/83.3 |
|---|---|---|---|
| 3,750,155 | 7/1973 | Oman | 340/183 |
| 3,818,230 | 6/1974 | Kubo | 250/338 |
| 3,857,258 | 12/1974 | Athey et al. | 73/362 |
| 4,035,644 | 7/1977 | Ciemochowski | 250/340 |
| 4,092,863 | 6/1978 | Turner | 73/362 |
| 4,150,573 | 4/1979 | Iinuma et al. | 73/362 |
| 4,153,835 | 5/1979 | Lau et al. | 250/214 |
| 4,420,265 | 12/1983 | Everest et al. | 374/133 |
| 4,464,067 | 8/1984 | Hanaoka | 374/170 |
| 4,475,823 | 10/1984 | Stone | 374/1 |
| 4,563,748 | 1/1986 | Hanaoka | 364/557 |
| 4,602,642 | 7/1986 | O'Hara et al. | 128/664 |
| 4,602,871 | 7/1986 | Hanaoka | 374/102 |
| 4,790,324 | 12/1988 | O'Hara et al. | 128/664 |
| 4,838,707 | 6/1989 | Ozawa et al. | 374/171 |
| 4,895,164 | 1/1990 | Wood | 128/736 |
| 5,056,929 | 10/1991 | Watanabe et al. | 374/181 |
| 5,150,969 | 9/1992 | Goldberg et al. | 374/128 |
| 5,159,936 | 11/1992 | Yelderman et al. | 128/736 |
| 5,169,234 | 12/1992 | Böhm | 374/128 |
| 5,178,464 | 1/1993 | Fraden | 374/129 |
| 5,178,468 | 1/1993 | Shiokawa et al. | 374/185 |
| 5,295,746 | 3/1994 | Friauf et al. | 374/170 |
| 5,333,784 | 8/1994 | Pompei | 236/91 |
| 5,378,873 | 1/1995 | Katzmann | 250/338.1 |
| 5,391,001 | 2/1995 | Rupert et al. | 374/130 |

Primary Examiner—Michael J. Tokar
Assistant Examiner—Virgil O. Tyler
Attorney, Agent, or Firm—Kenyon & Kenyon

[57] ABSTRACT

A method and apparatus are described for measuring the amplitude of radiation emitted by an object and compensating for the effects of ambient temperature fluctuations. A radiation sensor is provided receiving radiation from the object and converting it into an alternating current sensor output signal. A thermal sensor detects an ambient temperature proximately to the radiation sensor and generates an alternating current compensation signal having an amplitude proportional to the ambient temperature. A summing amplifier coupled to the radiation sensor and the thermal sensor combines the sensor output signal from the radiation sensor and the compensation signal from said thermal sensor to form an alternating current output signal. The amplitude of the alternating current output signal is proportional to the amplitude of radiation emitted by the object and excludes the effect on the instrument by the ambient temperature.

20 Claims, 3 Drawing Sheets

5,614,716

ALTERNATING CURRENT METHOD AND APPARATUS FOR AMBIENT TEMPERATURE COMPENSATION FOR MODULATED ENERGY SENSORS

BACKGROUND OF THE INVENTION

The present invention pertains to a method and apparatus for temperature compensation for modulated energy sensors. More particularly, the present invention pertains to a method and apparatus where a thermistor circuit is used to compensate readouts in an energy sensor for ambient temperature variations.

Modulated energy sensors are ones that detect electromagnetic radiation (e.g., infrared radiation, UV radiation, visible light, etc.), modulate the energy and generate an output referenced to the amplitude of the modulated signal. Examples of such modulated energy sensors are thermometers for remote temperature measurements as described in U.S. Pat. Nos. 4,233,512 and 5,391,001. In U.S. Pat. No. 5,391,001 there is a radiation detector, a temperature indicating device connected to the detector, and a modulator disposed in a path of a radiation beam from the object for converting the beam into a series of pulses when the modulator is vibrated in and out of the path. The modulator includes a primary piezoelectric element adapted to vibrate when subjected to driving signals at a frequency related to the resonant frequency of the modulator and having a portion of the primary element at the vibrating tip of the element electrically isolated from the driving element itself which is used to generate an electrical signal rather than respond to an electrical signal. The signal generated provides a measure of the physical motion; producing a maximum voltage at resonance. This signal is used to control the frequency of the driving circuit and seeks the frequency where mechanical resonance occurs, the point of maximum deflection in the horizontal plane. The modulator also includes a blocking element connected to the piezoelectric element and disposed to move in and out of the path of the beam.

In general, modulated optical energy measuring devices rely on alternating current (A.C.) signal amplification, rectification and integration to produce a D.C. signal output representing the energy being measured. There is a need for means to correct the effect of ambient temperature, which, if disregarded, can have a deleterious effect on the instrument's accuracy, stability and measurement repeatability. To counter the effects of ambient temperature variations, a correction signal is generated by employing a temperature sensitive element such as a thermistor that is used in a D.C. network or resistors or similar combinations of passive and active components that can suffer offset and drift complications. A common use for this D.C. compensation signal is to allow it to control gain in a circuit amplifier passing the modulated energy signal. There is a need for a method and apparatus which overcomes the aforementioned deficiencies and compensates for ambient temperature variations in a modulated energy sensing device.

SUMMARY OF THE INVENTION

These and other needs are satisfied by the method and apparatus of the present invention. A radiation sensor is provided which is capable of receiving electromagnetic radiation (e.g., infrared radiation) from an object and converting the radiation into an alternating current sensor output signal. A thermal sensor capable of detecting an ambient temperature proximately to the measuring instrument generates an alternating current compensation signal having an amplitude proportional to the ambient temperature. A summing amplifier, coupled to the radiation sensor and the thermal sensor, combines the sensor output signal from the radiation sensor and the compensation signal from the thermal sensor to form an alternating current output signal. The amplitude of the alternating current output signal is proportional to the amplitude of radiation from the object. In an environment where infrared radiation is being measured from the object (which is related to a temperature of the object), the output temperature for the instrument represents the temperature of the object by excluding the effect on the instrument by the ambient temperature.

An alternating current to direct current conversion circuit can be coupled to an output of the summing amplifier to convert the alternating current output signal to a direct current output signal. Either of these signals can be supplied to a display for the user. In one embodiment of the present invention, the thermal sensor is a temperature sensitive resistor, where a resistance value of the thermal sensor changes in dependence on the ambient temperature detected by the thermal sensor. By coupling an interrupter drive circuit to a beam interrupter, the radiation is converted to pulsed radiation for the radiation sensor. The sensor can then convert the pulsed signal into a sinusoidal signal. The interrupter drive circuit can also be coupled to the thermal sensor so that the alternating current compensation signal generated has the same frequency as the primary modulated signal.

One of the uses for the sensor of the present invention is for measuring the temperature of an object through the measurement of infrared radiation from the object. Small phase changes due to circuitry are corrected by a signal phase shifting circuit included in the main signal line. A scaling and calibration circuit coupled between the thermal sensor and the summing amplifier modifies the alternating current compensation signal so that a voltage amplitude of the compensation signal is proportional to the ambient temperature by a predetermined conversion factor. Phase changes due to target and background temperature relationship are accommodated for in the A.C. signal summing circuitry.

DETAILED DESCRIPTION

Figure 1:
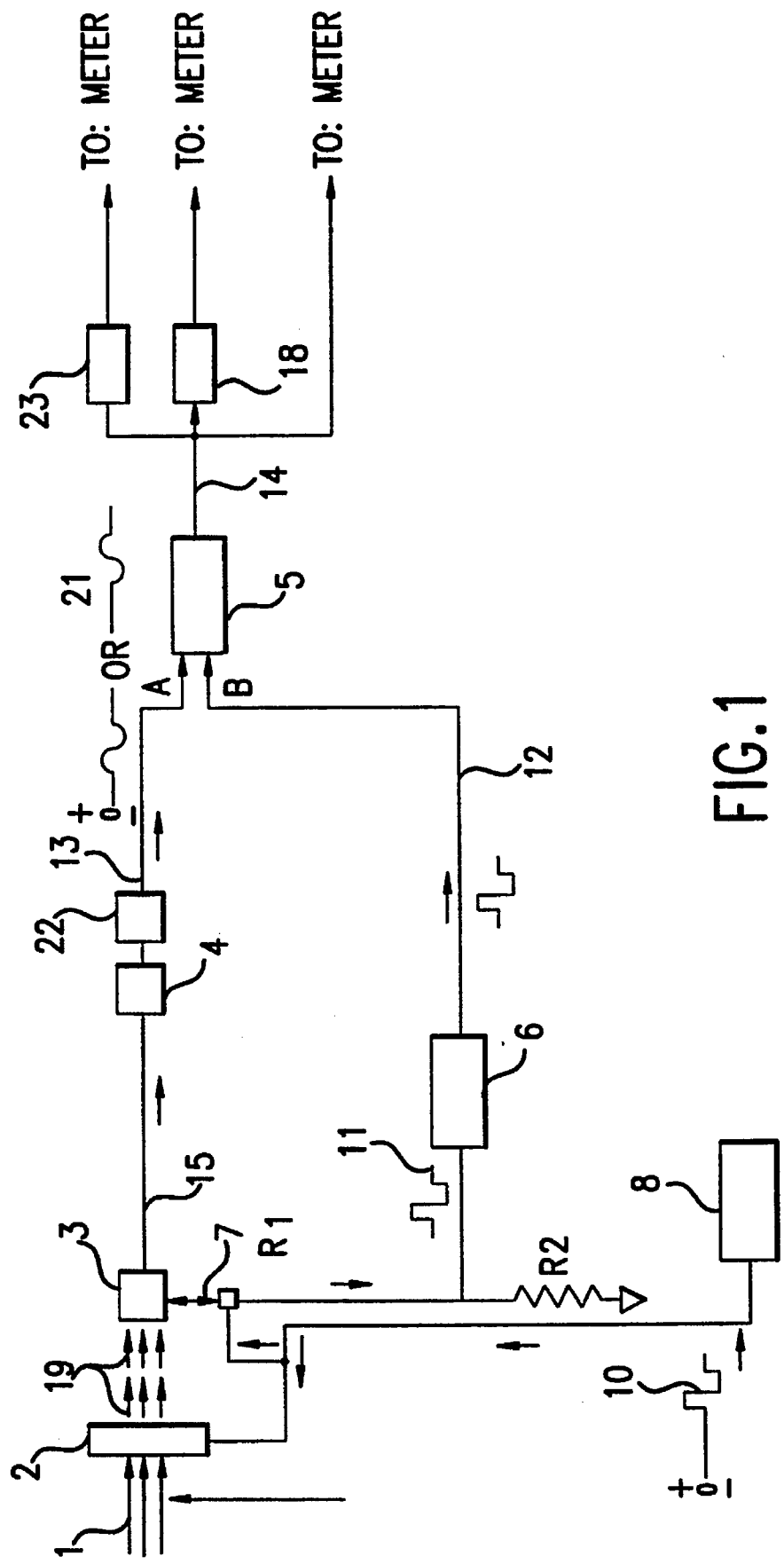
FIG. 1 is an ambient temperature compensation circuit constructed according to the present invention.

Modulated energy sensors can be used to measure a variety of different types of electromagnetic radiation. For example, such a sensor can be used to measure the amplitude of UV radiation or visible light. Modulated energy sensors can also be used to measure radiation having a higher frequency. Examples of the construction of a modulated energy sensor can be found in U.S. Pat. Nos. 4,233,512 and 5,391,001. In these examples, the modulated energy sensors are used to measure the temperature of an object through the measurement of infrared radiation.

In modulated energy sensors, such as the devices described in the aforementioned patents (also referred to as modulated optical sensors), ambient temperature fluctuations can have a deleterious effect on the displayed output. According to the present invention, an apparatus and method are provided for generating and applying a correction signal for these devices. An ambient temperature sensing element is provided which can be powered by the same source that powers the modulator circuit and synchronously adds or subtracts the compensation signal voltage to the modulated energy signal voltage exclusively on an A.C. signal basis. In the exemplary embodiment described below, ambient temperature compensation is performed for a modulated energy sensor measuring infrared radiation and temperature. One skilled in the art will appreciate that the method and apparatus of the present invention have applicability in modulated energy sensors for measuring radiation other than infrared radiation.

According to the method of the present invention, ambient temperature is measured for calibration purposes. In measuring temperature through infrared radiation, during this measurement, the ambient temperature will equal the target temperature (i.e., the target temperature is the temperature of the desired object, such as a patient). Once the modulated energy sensor has been calibrated for the ambient temperature, the energy modulated output signal will go to zero volts A.C. The numerical sum of the compensation signal and the modulated energy signal will be equal to the compensation signal alone if the target temperature equals the ambient temperature. As seen in Table I, if the ambient temperature and the target temperature are both 30° F., the total signal is approximately equal to the compensation signal.

TABLE I

| Ambient Temp. | Target Temp. | Modulated Energy Signal | Compensation Signal | Total Signal |
| --- | --- | --- | --- | --- |
| 30° F. | 30° F. | 0.01 V zero, or noise reading | 0.29 V | 0.30 V |
| 30° F. | 0° F. | −0.29 V | 0.29 V | 0.00 V |
| 30° F. | 100° F. | +0.71 V | 0.29 V | 1.00 V |
| 75° F. | 75° F. | 0.01 V | 0.74 V | 0.75 V |
| 75° F. | 30° F. | −0.44 V | 0.74 V | 0.30 V |
| 75° F. | 100° F. | +0.26 V | 0.74 V | 1.00 V |
| 100° F. | 100° F. | +0.01 V | 0.99 V | 1.00 V |
| 100° F. | 30° F. | −0.69 V | 0.99 V | 0.30 V |

If the target-to-ambient temperature ratio rises above or falls below unity, the modulated energy signal will add to or subtract from the compensation signal. The compensation signal magnitude in the example shown in Table I is approximately 0.01 Volts per °F. of ambient temperature. The compensation signal for the entire range can be set arbitrarily to a large value to make the signal output conveniently large when the modulated energy signal approaches the ambient temperature. As seen in Table I, the modulated energy signal is not exactly zero when ambient temperature equals target temperature. This is due to system noise or other uncontrollable noise sources. At ambient temperature, the A.C. compensation voltage signals are much higher in magnitude compared with the noise present in the total signal. The total A.C. signal of the summation shown in Table I is stable, robust and independent of D.C. offsets. No noise suppression methods are needed at very low signal levels when the target temperature approaches ambient temperature.

Referring to FIG. 1, the incoming radiation beams 1 impinge on beam interrupter 2 which generates a modulated energy signal 19 that strikes a radiation sensor 3. The beam interrupter 2 can be, but is not limited to, those described in U.S. Pat. Nos. 4,233,512 and 5,391,001. The radiation sensor 3 generates an electrical A.C. signal 15 which is transferred to a signal processing 4 and phase correction 22 circuits. The processed signal 13 or 21 is coupled to an input of a summing amplifier 5. As described above, the beam interrupter 2 is driven by interrupter drive circuits (shown here as element 8). The interrupter drive circuits 8 generate a square wave pulse signal 10 which is also sent to a thermal sensor 7, One skilled in the art will appreciate that, depending on the type of interrupter circuits used, the signal 10 generated could be a sine wave without affecting circuit performance. The thermal sensor 7 is a thermistor $R_1$ exhibiting a resistance that changes in dependence on ambient temperature. A resistor voltage divider network is formed by the thermistor $R_1$ and a fixed Resistor $R_2$. The voltage amplitude at the junction of $R_1$ and $R_2$ will vary in dependence on the ambient temperature due to the thermal sensitivity of the thermistor $R_1$. The resulting voltage signal 11 passes through scaling and calibration circuits 6 and becomes the ambient temperature compensation voltage 12 for the system operation. The compensation voltage 12 is supplied as an input to the second input of the summing amplifier 5.

Figure 2:
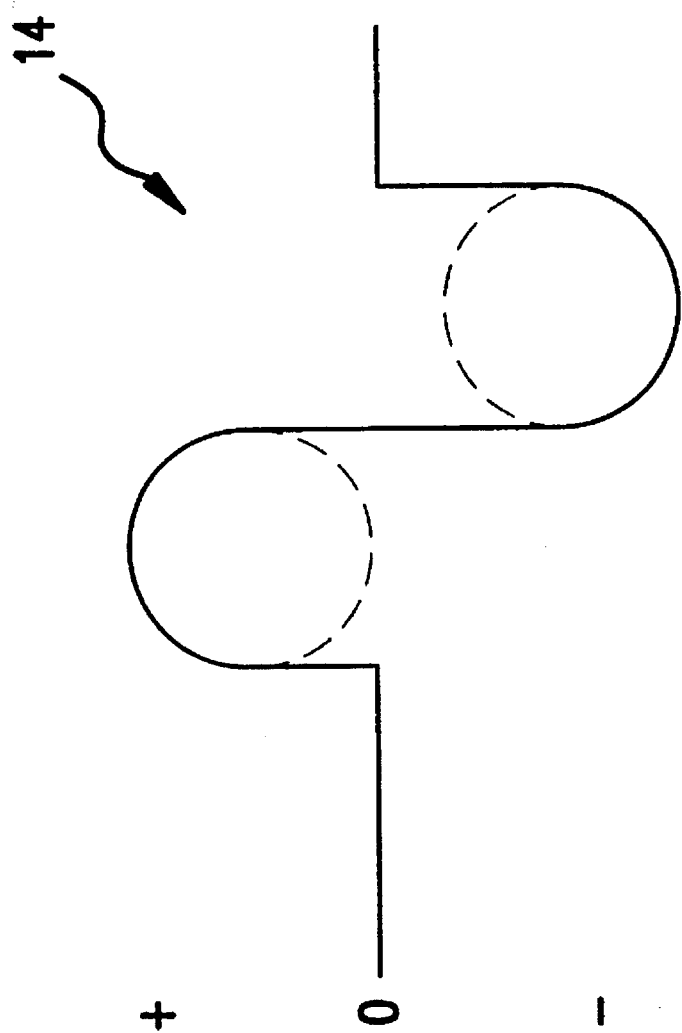
FIG. 2 is a graphical representation of the A.C. output signal generated by the circuit of FIG. 1.

As seen in FIG. 1, the output signal from the signal processing 3 and phase correction circuit 22 is a sinusoidal-type signal, while the output of the scaling and calibration circuits 6 is a square wave type signal. The summing amplifier 5 adds these two signals together to form an A.C. output signal 14. Referring to FIG. 2, the shape of the A.C. output signal is an indication of the ambient conditions related to the thermometer. If the peaks of the A.C. output signal have a convex shape (shown as a solid line) then the target temperature is higher than the ambient temperature. If the peaks of the A.C. output signal have a concave shape (shown as a dashed line), then the target temperature is lower than the ambient temperature.

The reason for the differing shapes of the A.C. output signal is related to the target temperature and the ambient temperature in the field-of-view of the modulated optical sensor. The interrupter blade 2 in the thermometer, is used to produce on/off periods where each cycle becomes the total target seen by the detector when it blocks the incoming radiation. Because the back surface of the blade is a mirror, the detector can determine that it is at the ambient temperature. This amount of radiation produces an output voltage representing a certain amount of energy in its field of view. If the target presented to the detector, when the interrupter moves out of the way, is higher in temperature, this will produce an amplitude with Phase "A" 13. If the temperature presented to the detector is less than the ambient temperature, this will produce an amplitude with Phase "B" 21. Optically, what is taking place is translated into an electrical signal that is going through a 180° phase shift relative to the interrupter drive signal 10, as shown at the input of the summing circuit, 5A. Here, signal 13 is the phase "A" signal (target temperature is higher than ambient temperature) and signal 21 is the phase "B" signal (target temperature is less than the ambient temperature). Thus, signals 13 and 21 account for the convex and concave aspects of the summed A.C. output signal 14, respectively.

The dynamic range of the modulated energy signal is only limited by the magnitude of the compensation signal that can be arbitrarily set in calibration. The phase correction circuit 22 only applies to small phase shifts due to circuitry alone. These phase shifts are due primarily to the resistor-capacitor ("RC") networks encountered in the detector and noise reduction circuits in the signal processor and is not related to the optical/electrical 180° phase shift due to the target temperature to ambient temperature relationship in the field of view.

The A.C. output signal 14 can be used with a peak and hold display circuit 23 or pass through an A.C./D.C. conversion circuit 18 to form a D.C. signal output for a display as shown in FIG. 1. Referring again to Table I and FIG. 2, the total signal voltage value is a true indication of target temperature at a conversion rate of, for example, 0.01 Volts per °F. The peak or RMS amplitude (in volts) of the combined signals (compensation signal) (shown in FIG. 2 by a solid or dotted line) is directly related to the ambient temperature. These two signals add in phase when the target temperature is greater than ambient temperature or subtracts in phase when the target temperature is less than ambient temperature. Thus, the A.C./D.C. conversion circuit 14 provides a D.C. output voltage which appears as the total signal shown in Table I. One skilled in the art will appreciate that conversion factors other than 0.01 Volts per °F. can be used in this method and apparatus.

The use of an A.C. method rather than a D.C. method avoids any D.C. coupled circuit difficulties arising from compensation or D.C. offset voltages or offset voltage drifts.

Figure 3:
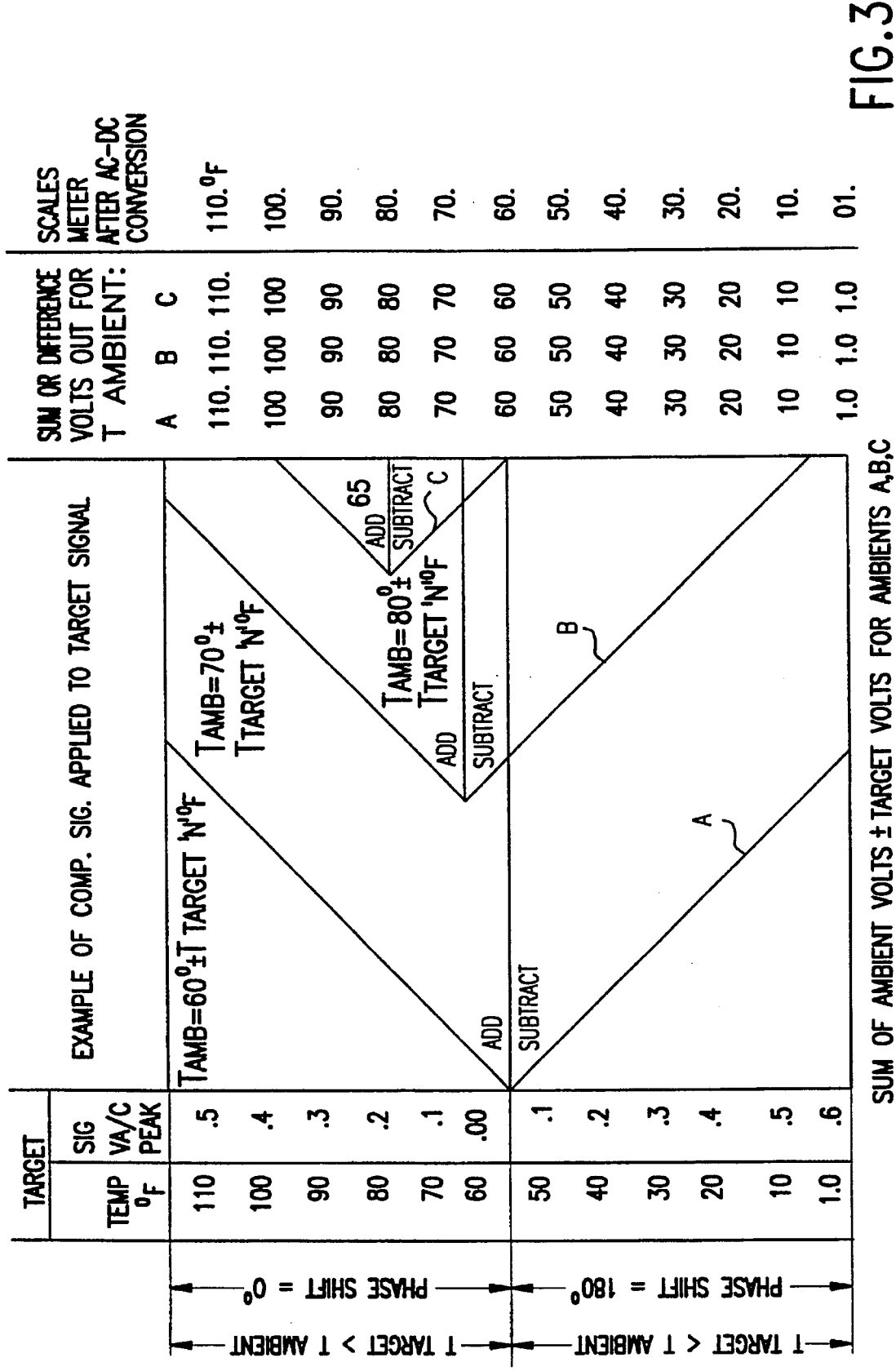
FIG. 3 is a graph displaying relationship between temperature and the compensated signal voltage.

One skilled in the art will appreciate that the rate of change of the voltage from the thermistor circuit 7 is required to match the rate of change of the energy producing the signal 13 or 21. A graph showing the relationship between temperature and the compensated signal voltage is shown in FIG. 3.

The present invention has been described in the foregoing specification with respect to specific embodiments that serve as examples to illustrate the invention rather than to limit its scope. Modifications may be made to the described embodiments without departing from the broader teachings of the invention.

What is claimed is:

1. A method of measuring an amplitude of radiation emitted by an optical energy source and compensating for ambient temperature fluctuations, comprising:

converting steady radiation from an object into an alternating current sensor output signal in a radiation sensor;

detecting ambient temperature with a thermal sensor located proximately to said radiation sensor;

generating an alternating current compensation signal in said thermal sensor having an amplitude proportional to said ambient temperature; and combining said sensor A.C. output signal from said radiation sensor and said A.C. compensation signal from said thermal sensor to form an alternating current output signal, such that an amplitude of said alternating current output signal is proportional to an amplitude of the radiation from said optical energy source.

2. The method of claim 1 further comprising converting said alternating current output signal to a direct current output signal in an alternating current to direct current conversion circuit.

3. The method of claim 2, further comprising indicating the temperature of said object at a display coupled to an output of said conversion circuit.

4. The method of claim 1 wherein said thermal sensor is a temperature sensitive resistor, such that a resistance value of said thermal sensor changes in dependence on the ambient temperature detected by said thermal sensor.

5. The method of claim 4 wherein the alternating current compensation signal output by said thermal sensor has a square wave characteristic.

6. The method of claim 1 wherein the alternating current sensor output signal of said radiation sensor has a sinusoidal signal characteristic.

7. The method of claim 4, further comprising:

converting the radiation from said energy source into a series of radiation pulses with a beam interrupter coupled proximately to said radiation sensor, said beam interrupter located in a path between said object and said radiation sensor; and controlling the generation of said series of radiation pulses with a beam drive signal, which concurrently supplies the drive signal for the generation of said alternating current compensation signal in said thermal sensor.

8. The method of claim 7, further comprising:

changing a phase of said alternating current sensor output signal relative to the beam drive signal, with a signal processing and phase correction circuit coupled between said radiation sensor and said summing amplifier to correct phase shift in circuits processing said alternating current sensor output signal.

9. The method of claim 8, further comprising: modifying said alternating current compensation signal with a scaling and calibration circuit coupled between said thermal sensor and said summing amplifier, such that a voltage amplitude of said compensation signal is proportional to said ambient temperature by a predetermined conversion factor.

10. An instrument for measuring the intensity of the energy of an optical radiation source having compensating for ambient temperature fluctuations, comprising:

a radiation sensor capable of receiving radiation from an object and converting said radiation into an alternating current sensor output signal;

a thermal sensor capable of detecting an ambient temperature proximately to said instrument and generating an alternating current compensation signal having an amplitude proportional to said ambient temperature; and a summing amplifier coupled to said radiation sensor and said thermal sensor, said summing amplifier combining said sensor output signal from said radiation sensor and said compensation signal from said thermal sensor to form an alternating current output signal, such that an amplitude of said alternating current output signal is proportional to an amplitude of the radiation from said optical radiation source.

11. The instrument of claim 10, further comprising an alternating current to direct current conversion circuit coupled to an output of said summing amplifier, said conversion circuit converting said alternating current output signal to a direct current output signal.

12. The instrument of claim 11, further comprising a display coupled to an output of said conversion circuit, said display presenting a measured value of the optical energy source.

13. The instrument of claim 10 wherein said thermal sensor is a temperature sensitive resistor, such that a resistance value of said thermal sensor changes in dependence on the ambient temperature detected by said thermal sensor.

14. The instrument of claim 13 wherein the alternating current compensation signal output by said thermal sensor has a square wave characteristic.

15. The instrument of claim 10 wherein the alternating current sensor output signal of said radiation sensor is a sinusoidal characteristic.

16. The instrument of claim 13, further comprising:

a beam interrupter coupled proximately to said radiation sensor, said beam interrupter located in a path between said object and said radiation sensor, said beam interrupter convening the radiation from said object into a series of radiation pulses; and an interrupter drive circuit coupled to said beam interrupter and said thermal sensor, said interrupter drive circuit controlling the generation of said series of radiation pulses and supplying current for the generation of said alternating current compensation signal, said interrupter drive circuit also providing a phase reference for the radiation pulses to control addition or subtraction in the summing amplifier.

17. The instrument of claim 16, further comprising:

a signal processing and circuit based phase correcting circuits coupled between said radiation sensor and said summing amplifier.

18. The instrument of claim 17, further comprising:

a scaling and calibration circuit coupled between said thermal sensor and said summing amplifier, said scaling and calibration circuit modifies said alternating current compensation signal such that a voltage amplitude of said compensation signal is proportional to said ambient temperature by a predetermined conversion factor.

19. A method of measuring temperature of an object with an instrument from infrared radiation emitted by the object and compensating for ambient temperature fluctuations, comprising:

converting infrared radiation from an object into an alternating current sensor output signal in a radiation sensor;

detecting ambient temperature with a thermal sensor located proximately to said instrument;

generating an alternating current compensation signal in said thermal sensor having an amplitude proportional to said ambient temperature; and combining said sensor output signal from said radiation sensor and said compensation signal from said thermal sensor to form an alternating current output signal, such that an amplitude of said alternating current output signal is proportional to a temperature of said object.

20. An instrument for measuring temperature of an object from infrared radiation emitted by the object and compensating for ambient temperature fluctuations, comprising:

a radiation sensor capable of receiving infrared radiation from an object and converting said infrared radiation into an alternating current sensor output signal;

a thermal sensor capable of detecting an ambient temperature proximately to said instrument and generating an alternating current compensation signal having an amplitude proportional to said ambient temperature; and a summing amplifier coupled to said radiation sensor and said thermal sensor, said summing amplifier combining said sensor output signal from said radiation sensor and said compensation signal from said thermal sensor to form an alternating current output signal, such that an amplitude of said alternating current output signal is proportional to a temperature of said object.

* * * * *